March 26, 1935.  J. D. FREDERICKS  1,995,300

WASHING MACHINE

Filed March 16, 1931   2 Sheets-Sheet 1

Inventor:
Joseph D. Fredericks,
by Charles E. Tuller
His Attorney.

March 26, 1935. J. D. FREDERICKS 1,995,300

WASHING MACHINE

Filed March 16, 1931 2 Sheets-Sheet 2

Inventor:
Joseph D. Fredericks
by Charles E. Tullar
His Attorney.

Patented Mar. 26, 1935

1,995,300

UNITED STATES PATENT OFFICE 1,995,300

WASHING MACHINE

Joseph D. Fredericks, Irvington, N. J., assignor to General Electric Company, a corporation of New York Application March 16, 1931, Serial No. 522,946

35 Claims. (Cl. 141—9)

My invention relates to washing machines more particularly to dishwashing machines, and has for its object the provision of an improved washing machine of this character which is substantially automatic in its operation and is easy to control; and further, one which has a comparatively sturdy and simple construction.

In carrying my invention into effect in one form thereof, I provide a washing machine with a dish and like utensil supporting rack movably mounted in the washing chamber or vat so that it can be moved from its working position to a loading and unloading position; suitable power means, such for example as a fluid motor, is provided to operate the rack between these positions whereby the manual labor of lifting dishes and the like into and out of the washing chamber is eliminated.

I also provide suitable means for effecting a cleansing action on the dishes supported in the rack. In one form of my invention, I provide a spray device for this purpose, this device being located in the vat below the dish supporting rack and arranged to spray a cleansing fluid, such as water, upwardly through the rack so as to effect a cleansing action on the dishes supported therein.

In order to supply the fluid operating motor for the dish supporting rack with an operating fluid under pressure, and also to supply a cleansing fluid to the spray device, I provide a suitable pump; the discharge of this pump is connected by conduit means with the fluid motor and also with the spray device, while its intake, in one form of my invention, is connected with the washing vat so that fluid supplied to the vat can be withdrawn therefrom by the pump and delivered under pressure to the fluid motor and to the spray device.

Suitable valve means are provided for controlling the conduits between the pump and the fluid motor and spray device, and also between the vat and a suitable source of fluid supply, such as the ordinary city hydrant; and valve actuating control means are provided whereby the valves are operated in accordance with the operation of suitable manually operable control means and in response to predetermined time intervals so as to provide a predetermined cycle of operation of the machine. This cycle of operation in one form of my invention includes a starting cycle, in which water is admitted to the vat from the source of supply, and the dish rack is lifted to its loading position; a washing cycle, in which the rack is moved to its working position and the dishes and utensils supported in the rack are washed and rinsed and then are delivered by the rack to the unloading position; and a finishing cycle, in which the dish supporting rack is moved to its working position, the vat is cleansed and the fluid in the vat is discharged.

I further provide suitable means for preventing the operation of the manually operable control means except in such manner as to provide the predetermined cycle in the operation of the machine.

For a more complete understanding of my invention, reference should be had to the accompanying drawings in which.

Referring to the drawings, I have shown my invention in one form as applied to a dishwashing machine comprising a washing chamber or vat 10 having a bottom wall 11 tapering downwardly toward its central portion where an aperture 12 (Fig. 7) is provided. The washing vat 10 is supported upon a suitable pedestal 13 comprising a circular base 14 and a plurality of column-like vertically arranged members 15 secured at their lower ends to the base member 14 and at their upper ends to a second ring member 14b on which the vat rests and to which it is secured. Arranged about the mouth of the vat is a table-like ledge 16 provided at one edge with an extension leaf 17. This leaf may be secured to the table in any suitable manner but preferably will be connected thereto by hinge means 18 such as are described and claimed in the patent to William Joseph Kassick, No. 1,918,040, dated July 11, 1933, and assigned to the same assignee as this invention.

Figures 6, 7:
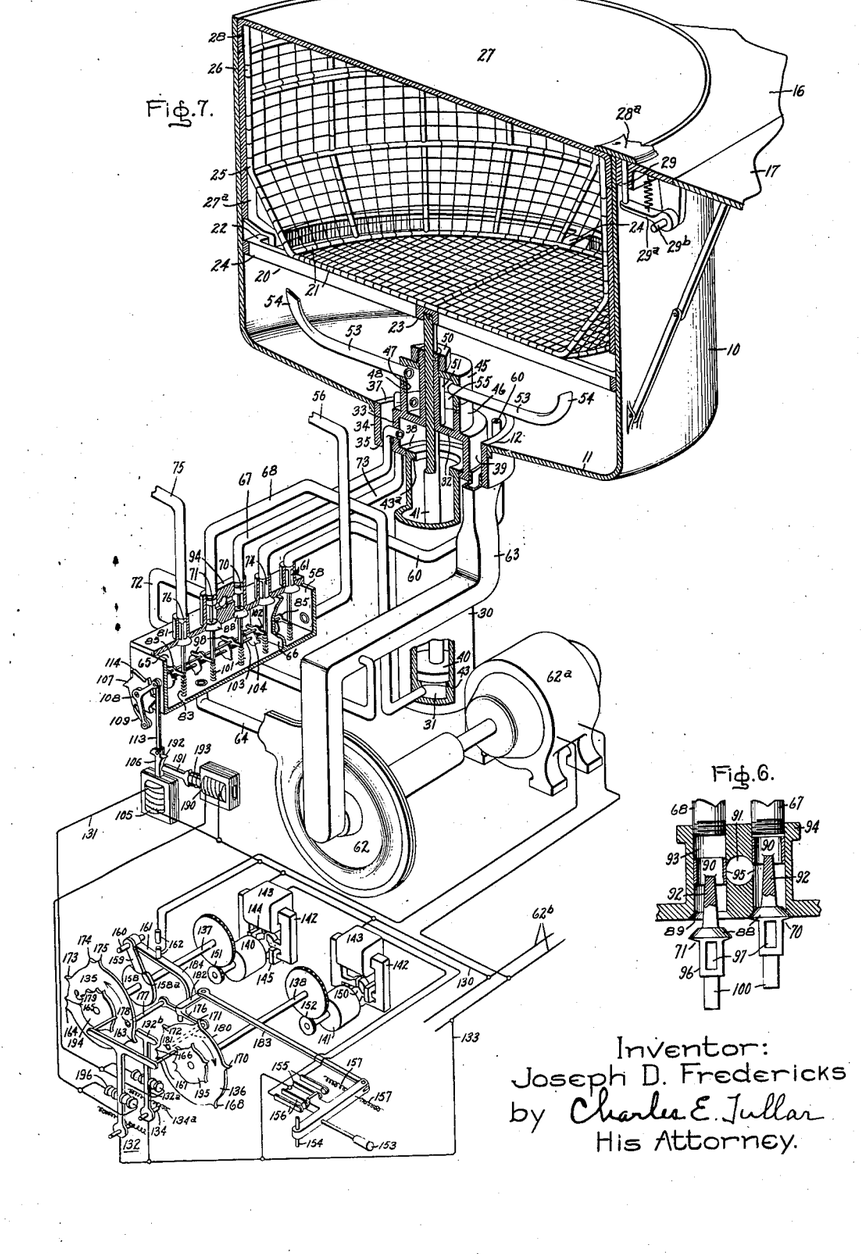
Fig. 6 is a sectional view illustrating certain of the valves used in the valve means of Figs. 2 and 3.
Fig. 7 is a diagrammatic perspective view of the washing machine of Fig. 1, together with operating and controlling mechanism therefor arranged in accordance with my invention.

Arranged within the vat 10 is a suitable dish and like utensil supporting rack 20 (Fig. 7) movably mounted in the vat so that it can be moved from its working position, shown in Fig. 7, to a loading and unloading position. As shown, this rack comprises a supporting base 21 defined by a circular-shaped member 22 having a sliding fit with the inner cylindrical surface of the vat and a central hub-like portion 23 connected to the circular portion 22 by means of radial arms 24, preferably formed integrally with the members 22 and 23. Supported on the base 20 is an open-work dish and like utensil receiving basket 25. Above the basket 25 is a cover member 27 supported on suitable vertically arranged arms 27a provided on the base; as shown in Fig. 7, the cover is flush with the table 16 when the dish rack is in its working position. The cover 27 is provided with a peripheral downwardly projecting flange 28 which has a sliding fit with the inner cylindrical surface of the vat, and with a laterally projecting flange 28a, a portion only of which is shown (Fig. 7). It will be observed that when the rack is in its working position as shown in Fig. 7 the cover member 27 together with the table ledge 16 provide a table which can be used in the place of the ordinary kitchen table when the machine is not in use. Preferably the loading and unloading position of the rack will be such that the basket 25 can be conveniently slid off of its supporting base 20 onto the ledge 16. To effect this the rack is moved so that the upper surface of the base 20 is substantially flush with the ledge 16.

At times it may be desired to raise the cover 27 when the machine is not being used. For this purpose I have provided a pin 29 (Fig. 7) arranged on the exterior of the vat for vertical movement into engagement with the cover ledge 28a. This pin rests on an arm 29a which is secured to an operating rod 29b and is held in engagement with the pin by means of a suitable tension spring as shown. The rod 29b extends to one edge of the table ledge 16 where an operating lever 29c is provided on the rod whereby it can be turned so as to move the arm 29a upwardly to cause the pin 29 to engage the cover and lift it. It will be understood that it is only necessary to lift the cover a distance sufficient to allow the attendant to insert the fingers under the lid so that it may be raised manually.

As has been pointed out, suitable power means are provided for moving the dish supporting rack between its working and its loading and unloading positions. This power means in one form of my invention comprises a suitable fluid motor. This motor comprises a cylinder 30 arranged in a vertical position beneath the vat 10 and suspended from the vat. The cylinder, as shown, projects upwardly so that its upper edge lies a short distance below the opening 12 provided in the bottom wall of the vat, and arranged so that the cylinder is substantially concentric with this opening. The lower end of the cylinder is closed by a suitable head 31, while its upper end is closed by means of a suitable head 32, which is arranged in the space between the upper end of the cylinder and the bottom of the vat. As shown, this head 32 comprises an inverted cup-like member 33 and a cylindrical member 34 surrounding the cup-like member in spaced relation therewith and joined with the lower end of this member by means of a horizontal member 35. The members 33, 34, and 35 may be and, as shown, are formed integrally with each other. The outside diameter of the member 34 is substantially equal to the diameter of the aperture 12, and the member 32 is secured to the vat so that the upper surface 37 of this member 34 is substantially flush with the inner bottom surface of the vat. The inner wall 33 is provided at its lower edge with an inwardly projecting flange 38 fitted about the upper end of the cylinder 30. It will be understood that suitable fluid-tight packings will be arranged between the member 34 and the vat and between the member 33 and the motor cylinder. It will be observed that the inverted cup-like head together with its surrounding wall 34 define an annular chamber 39 projecting downwardly from the lowermost portion of the lower wall 11 of the vat.

The fluid motor further comprises a suitable piston 40 arranged to operate in the cylinder 30 and provided with a piston rod 41 extending upwardly through the cylinder head 32 and suitably connected directly with the base 20 provided for the dish supporting rack. The cylinder is provided in its lower end portion with a ledge 43 upon which the piston rests when the dish supporting rack is in its lower or working position, the lower position of the rack being established by this ledge, and at its upper end with a ledge 43a to establish the loading and unloading position of the rack; it will be understood that the piston will have a stroke sufficiently great so that when it is moved to its upper position in the cylinder the base 20 of the dish supporting rack will be substantially flush with the table ledge 16.

Arranged within the vat 10 beneath the dish supporting rack is a suitable spray device arranged to project a spray of cleansing fluid, such as water, upwardly through the open-work basket to effect a cleansing action on the utensils placed in the basket. As shown this spray device is of the reaction type comprising a suitable hub member 45 arranged to rotate upon a circular member 46, constituting a bearing member, formed upon the upper surface of the cylinder head 32. As shown diagrammatically, the hub 45 is provided with a depending portion 47 having an outside diameter less than that of the outer surface of the hub and received in a cooperating recess 48 provided for it in the upper portion of the bearing member 46. It is to be understood that a fluid-tight joint will be provided between these members. The hub 45 is secured against vertical displacement from its bearing member 46 by means of a nut 50 threaded upon the upper end of a sleeve 51 projecting upwardly from the cylinder head 32 and surrounding the piston rod 41. A pair of nozzle members 53 are carried by the hub on its opposite sides in diametrical arrangement, the inner ends of these nozzle members being secured to the hub, while their opposite ends are provided with up-turned nozzles 54, directed from the vertical in opposite directions. These nozzles are defined by flattened or pinched end portions of the tubes, the flattened nozzles being arranged to cause the fluid issuing therefrom to be sprayed out in fan-like form, whereby the spray moves through a comparatively wide circular path as the nozzles are rotated.

It will be observed that the hollow hub 45 and its cooperating bearing member 46 constitute in effect a fluid manifold 55 for the nozzle members and that fluid supplied to this manifold under pressure will be directed through the tubular members 53 and thence through the nozzles 54; it will be understood that the reaction of the fluid on the nozzles in issuing therefrom will impart a rotary motion to the spray device.

Figure 1:
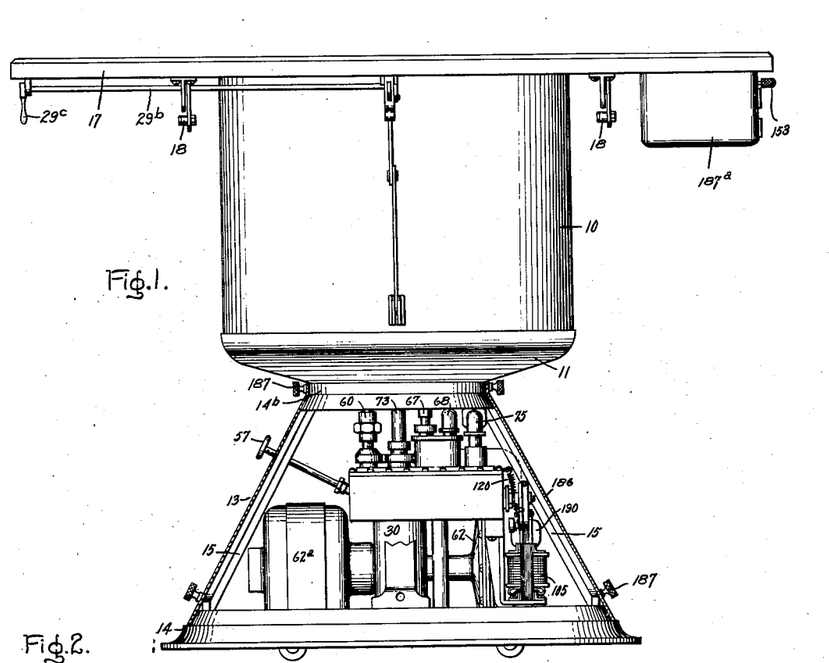
Fig. 1 is an elevation of a dishwashing machine embodying my invention, portions of the machine being removed and other portions being broken away so as to illustrate certain structural details.

A cleansing fluid, such as water, is supplied to the vat 10 from a suitable source of supply, which may be the ordinary city hydrant; as shown water is fed to the vat from a suitable conduit 56 which will be connected with the hydrant. This conduit is provided with a control valve 57 (Fig. 1). The conduit communicates with a supply manifold 58 which in turn communicates with the vat by means of a conduit 60. As shown the conduit 60 communicates with the vat through the annular chamber 39 provided in the extreme lower portion of the vat. A suitable control valve 61 is arranged in the manifold 58 for controlling the conduit 60.

In order to provide the fluid motor with fluid under pressure for operating the rack between its working and its loading and unloading positions and in order to supply the manifold 55 with fluid under pressure for operating the spray device I have provided a suitable centrifugal pump 62. This pump may be operated by any suitable means but preferably will be operated by means of a suitable alternating current motor 62a. A suitable alternating current source of supply 62b is provided for the motor.

As shown, the intake 63 for this pump connects with the annular chamber 39 through its lower wall 35, the vat thus constituting a fluid reservoir for the pump. The delivery pipe 64 of this pump communicates with a manifold 65 the walls of which may be formed integrally with the walls of the intake manifold 58, the two manifolds being separated by means of a suitable partition 66.

The manifold 65 communicates with the upper and lower ends of the cylinder 30 by means of suitable conduits 67 and 68 whereby fluid supplied to the manifold 65 from the pump delivery 64 may be fed to the opposite sides of the operating piston 40. These conduits further serve to exhaust the fluid from the cylinder. Suitable valves 70 and 71 are provided in the manifold 65 for controlling the conduits 67 and 68. These valves further serve to control communication between these conduits and an exhaust conduit 72 arranged to convey the fluid which is exhausted from the ends of the cylinder to the pump intake 63.

The manifold 65 also communicates with the intake manifold 55 provided for the spray device by means of a conduit 73, this conduit being controlled by a valve 74 arranged in the manifold 65.

The manifold 65 further communicates with a suitable discharge conduit 75, a controlling valve 76 for this conduit being arranged in the manifold.

Figure 5:
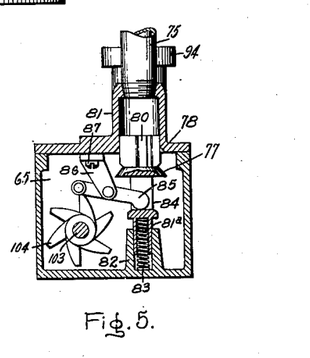
Fig. 5 is a vertical section taken through the line 5—5 of Fig. 2 and looking in the direction of the arrows.

The valves 61, 74 and 76 are similar in construction, the valve 76 only being shown in detail (Fig. 5). The valve 76, as are the valves 61 and 74, is provided with a tapered valve portion 77 which cooperates with a correspondingly tapered valve seat 78 arranged in the upper wall of the manifold 65; the valve is further provided with a fin-like guiding member 80 slidably received in an outwardly projecting tubular portion 81 provided for it on the upper wall of the manifold 65. It is within this portion that the end of the associated conduit 75 is received in watertight threaded engagement. The valve is further provided with a depending hollow cylindrical guiding member 81a which is received in telescopic relation by a cylindrical member 82 formed on the lower wall of the manifold. Interposed between the valve and the bottom wall of the manifold and received by the tubular members 81a and 82 is a compression spring 83, this spring being arranged to apply a force to the valve so as to bias it to its closed position.

The cylindrical member 81a is connected to the valve portion 77 by means of a pair of members 84 arranged in spaced relation. In the space between the members 84 is received one end of a valve operating lever 85. As shown this lever is pivotally supported intermediate its ends by means of suitable brackets 86 secured in any suitable manner, as by means of screw fastening means 87, to the inner surface of the upper wall of the manifold. This actuating lever is arranged so that when it is turned on its pivotal mounting in a clockwise direction, as viewed in Fig. 5, it will engage the valve to move it to its opening position against the bias of the spring 83.

The valves 70 and 71 which control the conduits 67 and 68 providing communication between the manifold 65 and the opposite ends of the fluid motor cylinder 30 are similar in construction and are shown in detail in Fig. 6. These valves are provided with tapered valve portions 88 cooperating with tapered valve seats 89 provided for them in the upper wall of the manifold 65 so as to control the communication between the manifold 65 and the conduits 67 and 68. These valves are further provided with hollow cylindrical valve portions 90. As shown, these valve portions 90 are formed integrally with the portions 88, mechanical connections between the portions 88 and 90 being effected by means of suitable members 92 secured at their lower ends to the valves 88 and at their upper ends to the valves 90. The valves 90 are received in suitable chambers 93 arranged in a valve housing 94 so as to control ports 95 providing communication between the chambers 94 and a discharge 91, which leads to the exhaust conduit 72. It will be observed that the conduits 67 and 68 are received in threaded engagement in the upper ends of the chambers 93.

The valves 70 and 71 are further provided with depending portions 96 in which slots 97 are provided for receiving the end portions of actuating levers 98 (Figs. 2 and 7) which will have substantially the same construction and will be mounted in substantially the same fashion as are the actuating levers 85 provided for operating the valves 61, 74 and 76. The valves 70 and 71 will further be provided with depending hollow cylindrical portions 100 for receiving pressure springs 101 (Fig. 7) to bias the valves 88 to their closed positions. These members 100 are received in telescopic relation by cylindrical members 100a (Fig. 2) provided in the bottom of the manifold 65.

It will be observed that when either of the valves 70, 71 is operated so that the valve portion 88 is moved to open the port 89, the valve portion 90 will be moved to close its associated discharge port 95, and when the valve is operated so that the valve portion 88 moves to close its port 89 the cylindrical portion 90 will be moved to open its discharge port 95. In other words, when either of the valves 70, 71 is actuated so as to permit fluid to pass from the manifold 65 through the port 89 and cylindrical valve 93 to one end of the fluid motor to operate the piston in one direction, that end of the cylinder will be closed to the discharge port 91 by means of cylindrical valve portion 90. It will be understood that in the operation of the fluid motor when one valve 70, 71 is moved to open its associated port 89 to permit fluid to pass to one side of the piston, the other valve will remain closed so that the fluid on the opposite side of the piston can discharge through the ports 95 and 91 to the exhaust conduit 72.

Figures 2, 3, 4:
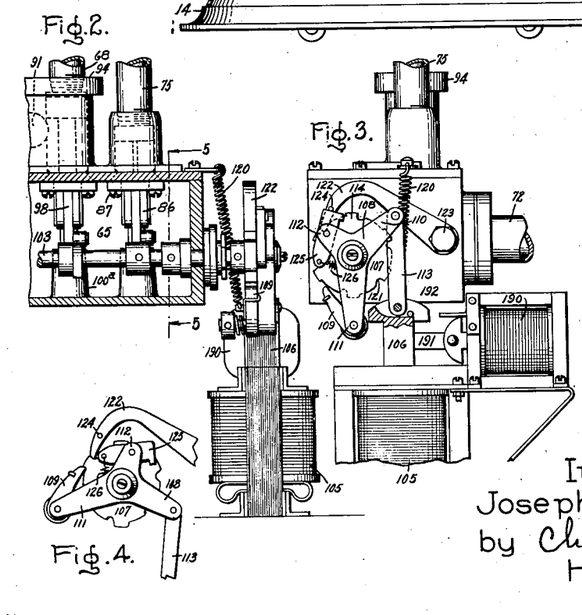
Fig. 2 is a fragmentary view in front elevation of control valve means and operating mechanism therefor used in the washing machine of Fig. 1, portions being shown in section.
Fig. 3 is a fragmentary view in end elevation of the control valve means and operating mechanism of Fig. 2.
Fig. 4 is a view in elevation illustrating certain portions of the valve operating mechanism of Figs. 2 and 3.

In the diagrammatic view (Fig. 7), the valve actuating levers 85 and 98 are shown to be pivoted upon a common supporting rod-like member 102 arranged longitudinally of the manifolds 85 and 65, but it will be understood that these actuating members preferably will be provided with separate pivotal supporting means, as shown in Figs. 2 and 5. All of the valves provided in the manifolds 58 and 65 are provided with a common operating shaft 103 on which suitable cam members 104 are provided, each valve being provided with one actuating cam member 104. As shown, the cam member 104 provided for the valve 74 is provided with two lifts whereas the cam members for the remaining valves are provided with but one lift. It will be understood that these cams will be so arranged upon the operating shaft 103 and the lifts will be so arranged on the cams that when the shaft is rotated in a predetermined direction, as for example, in a clockwise direction as viewed in Figs. 3, 4 and 7, the valves will be operated in a predetermined sequence so as to establish a predetermined cycle of operation of the washing machine.

The valve shaft 103 is provided with a suitable operating electromagnet 105 mechanically connected with the shaft so as to impart to it a step-by-step motion. As shown (Figs. 2 and 3) the valve shaft projects from one end of the manifold housing and is mechanically connected to the armature 106 provided for the electromagnet 105 through the medium of a suitable mechanical connection provided to give the shaft a step-by-step motion when the electromagnet is repeatedly energized and deenergized. This mechanical connection, as shown, comprises a ratchet wheel 107 secured to rotate with the shaft, an actuating member or lever 108 mounted to rock freely on the end portion of the valve shaft and a pawl 109 carried by the member 108. It will be observed that the member 108 has three radially disposed arms 110, 111 and 112 arranged at angles of substantially 120 degrees with respect to each other. The arm 110 is mechanically connected to the armature 106 by means of a link 113 which, as shown, has its upper end connected to the extreme free end portion of the arm 110 and at its lower end is connected to the upper end of the armature 106. The arm 111 serves to pivotally mount the pawl 109, this pawl as shown being mounted on the extreme free end of the arm. It will be observed that the ratchet wheel is provided with a plurality of teeth or notches 114 arranged about its periphery, these teeth being arranged to be engaged by the driving pawl 109 when the latter is moved in a clockwise direction, as viewed in Fig. 3, by the rocking member 108.

It will be observed that with the arrangement thus far described when the electromagnet is energized so as to pull its armature downwardly, as viewed in the drawings, the arm 108 will be rotated freely on the valve shaft in a clockwise direction, and in doing so will move the pawl through a short distance before it engages the tooth 114 next in its line of movement. At the end of this short distance the pawl will engage the notch 114 and thereby will move the shaft through one step of its movement the length of the arc of movement of the shaft being dependent upon the stroke of the armature and the leverage interposed between the armature and the ratchet wheel. The rocking lever 108 and the armature 106 are returned to their respective positions shown in Fig. 3, when the electromagnet 105 is deenergized, by means of a suitable tension spring 120 which, as shown, is secured at its upper end to the manifold housing and at its lower end is secured to the upper end of the armature. If the electromagnet be reenergized the shaft will be operated through another step of its motion, and so on for each operation of the electromagnet.

In addition to the teeth 114 engaged by the driving pawl 109 the ratchet wheel 107 is provided with locking notches 121 which are arranged to receive the free end portion of a locking lever 122. This lever, as shown, is pivotally mounted at one end to the adjacent wall of the manifold housing by means of a suitable stud or like member 123 and is curved downwardly so that its free end portion is arranged at an angle slightly less than 90° with the body portion of the lever. As will be observed in Fig. 3 this free end portion is received in the notches 121 so as to lock the valve shaft against rotation except at the proper times. In order to lift the locking lever or pawl 122 out of a locking notch so as to permit the ratchet wheel to be moved by the pawl 109, the locking pawl is provided with a projecting lifting pin 124, which is engaged by a lifting finger 125 pivotally mounted on the free end portion of the third arm 112 provided on the rocking member 108. This pivotally mounted lifting finger normally is held by a tension spring 126 carried by the member 108 in such a position that as the lever 108 begins to move in a clockwise direction to rotate the ratchet wheel through one step of its motion, the upper end of the lifting finger will come into contact with the lifting pin and will raise the end of the locking pawl out of the locking notch of the driving wheel just before the pawl 109 engages the next operating tooth 114 of the ratchet wheel. Further clockwise movement of the lever 108 moves the ratchet wheel with it and also carries the lifting finger out from under the pin 124 so that the locking pawl can drop into engagement with the ratchet wheel and fall into a locking notch when the ratchet wheel finishes its one step of motion; this operation of the locking pawl and its release is clearly shown in Fig. 4. When the electromagnet 105 is deenergized and the rocking lever 108 is swung back in a counter clockwise direction towards its original position, shown in Fig. 3, the pivoted lifting finger 125 passes under the lifting pin 124 but does not lift the locking pawl 122 because the pivoted lifting finger 125 swings on its pivot in a clockwise direction against the tension of its retaining spring 126. By the time the rocking lever 108 has reached its initial position the lifting finger is out from under the pin 124 and the spring 126 pulls or snaps the lifting finger back to its original position shown in Fig. 3 ready for the next operating stroke of the electromagnet 105.

In view of the foregoing arrangement, it will be observed that irrespective of the force with which the electromagnet 105 actuates the arm 108 it will be impossible for the valve shaft to overrun by reason of the locking mechanism provided for it.

The electromagnet 105 is energized and deenergized at predetermined intervals of time by means of a suitable timing mechanism so as to impart a step-by-step motion to the valve shaft, the steps occurring at suitable predetermined intervals, and the timing mechanism being under the control of a suitable manually operable member so that only a predetermined cycle of operation of the washing machine can be effected. The electromagnet 105 is provided with a suitable energizing circuit which may be traced from one side of the alternating current supply source 62b, through a conductor 130, the operating coil of the electromagnet 105, a conductor 131, a control switch 132 and thence through a conductor 133 to the opposite side of the alternating current supply source 62b. It will be observed that movable element 132a of the switch 132 has a neutral position in which it is shown in Fig. 7, and two controlling positions one being arranged on each side of the neutral position. In either of these controlling positions, it will be observed that the switch completes an energizing circuit for the electromagnet 105, whereas when it is moved to its neutral position it effects a deenergization of the electromagnet. The movable member 132a is fixedly pivoted at 134 so as to move about this point to either of its controlling positions, and is biased to its neutral position by means of suitable opposed springs 134a.

The movable member 132a of the switch is moved between its controlling positions by means of a pair of cams 135 and 136 each of which is provided with a plurality of lifts for engaging a member 132b provided on the movable member of the switch. These cams are arranged so that when any one of the cam lifts engages the member 132b, the element 132a of the switch will be moved so as to close an energizing circuit for the electromagnet 105. It will be understood that as long as any one of the cam lifts is in engagement with the switch the electromagnet will remain energized, and that the valve shaft will remain in the position to which it has been actuated by the energization of the magnet until the magnet is again energized so as to move the shaft through another step of its motion. In this manner the interval of time that the shaft remains in its actuated position depends upon the speed of rotation of the actuating cam and upon the distances between the cam lifts.

The cam 135 is provided with an operating shaft 137 and the cam 136 is provided with a similar operating shaft 138. These shafts are arranged to be rotated at substantially constant speeds by means of suitable constant speed devices, such as self-starting synchronous motors 140 and 141 of the type described and claimed in the United States patent granted to H. E. Warren No. 1,546,269, dated July 14, 1925. Each of these motors comprises a bi-polar field magnet 142 having a single phase energizing winding 143 and with suitable shading coils 144 and 145 for controlling the magnetic flux in the pole faces of the device. Each of the motors is further provided with a suitable rotor 150 mounted within the rotating magnetic field produced by the field member. The rotor consists of one or more split rings of permanent magnetic material suitably supported on a spider or shaft. This rotor is capable of starting from rest and rotating in exact synchronism with the rotating magnetic field. These motors 140 and 141 are mechanically connected through suitable reduction gearing arrangements 151 and 152 so that while the motors rotate at a very high speed the cam members 135 and 136 are rotated at a relatively slow speed. The motors 140 and 141 may be and, as shown, are electrically energized from the alternating current source of supply 62b.

The energization of the motors 140 and 141 is controlled by means of a suitable manually operable lever 153 which has a neutral position, in which position the lever is shown in Fig. 7, and two controlling positions, one for controlling the energization of the motor 140 and the other for controlling the energization of the motor 141.

This manually operable control member 153, as shown, is pivotally mounted upon a suitable fixed supporting member 154 and is arranged so that if it is moved in a clockwise direction, as viewed in Fig. 7, it will close its right-hand contacts 155 to effect the energization of the motor 140, while if it is moved in the opposite direction it will close its left-hand contacts 156 to effect the energization of the motor 141. Movement of the control lever 153 from either of its controlling positions to its neutral position effects the deenergization of the corresponding motor 140, 141. The control member is normally biased to its neutral position by means of a pair of opposed spring members 157.

Mounted on the shaft 137 so as to rotate with it and with the cam 135 is arranged a suitable cam member 158. This cam member controls the energization of the electric motor 62a provided to operate the centrifugal pump 62. As shown, an arm 159 pivotally mounted at 160 cooperates with the cam member 158 so as to normally rest in a depressed portion 158a provided in the cam whereby as the cam 158 is rotated the cam will cause the arm 159 to move in a counterclockwise direction. Rigidly secured with the arm 159 is a second arm 161 which arm carries the movable contact of a pair of cooperating contacts 162 arranged, as shown, in the energizing circuit of the motor. It will be observed that as the cam 158 rotates so as to turn the arm 159 in a counterclockwise direction the arm 161 also will be operated in this direction so as to close the contact 162 to the pump energizing circuit; the cam 158 is arranged to hold these contacts closed until it has moved to such a position that the arm 159 is again received in the cam depression 158a.

The cam member 135 provides a starting and finishing cycle of operation, whereas the cam member 136 provides a washing and rinsing cycle of operation; the starting cycle of the washing machine is effected during the first half revolution of the cam member 135, the washing and rinsing operation is effected by a complete revolution of the cam member 136, and the finishing operation is effected by the second half revolution of the cam 135. The cams 135 and 136 will be rotated in the directions indicated by the arrows in Fig. 7 and at predetermined constant speeds.

During the first half revolution of the cam 135 the first cam lift 163 moves into engagement with the switch portion 132b and rocks the switch arm toward the right, as viewed in Fig. 7, thereby completing the energizing circuit for the electromagnet 105, which operation, as has been previously pointed out, moves the valve shaft 103 through one step of its motion. This operation causes the cam member associated with the valve 61 to engage the valve operating arm 85 to open the valve thereby admitting water from the supply manifold 58 and into the vat. The electromagnet will be energized as long as the lift 163 maintains the switch closed, but the valve 61 will remain open until the next succeeding cam lift 164 engages the switch 132 to effect an energization of the electromagnet, the lifts being spaced sufficiently to permit the valve to remain open for a suitable time interval whereby the proper amount of water will be allowed to flow into the vat. This time interval will be such that the water will rise to a level slightly below the radial arms 53 of the spray device.

As the cam 135 rotates the cam 158 will cause the contacts 162 to close so as to effect the energization of the pump motor 62a thereby starting the pump. This operation of the pump withdraws water from the vat and discharges it to the manifold 65. Presently the lift 164 of the cam will engage the switch to move it to its right-hand position so as to again effect the energization of the electromagnet, whereby the valve shaft is moved through another step of its motion.

This operation of the shaft causes the valve 61 to close, and the valve 74 to open whereby water is admitted to the spray device for a predetermined interval of time; this time interval being determined by the distance between the lift 164 and the next succeeding lift 165. This operation of the shaft merely effects a preliminary rinsing of the vat.

As the cam continues to rotate the next lift 165 will cause the switch to close to effect the energization of the electromagnet to cause the valve shaft to move through its third step of motion. This operation of the valve shaft causes the valve 74 to close and the valve 71 to open whereby fluid is admitted through the conduit 68 to the lower end of the fluid motor cylinder 30 so as to cause the fluid actuated piston 40 and its attached dish supporting rack to rise to the loading and unloading position; the valve 74 will be held open so that the rack will be held in its elevated position by the fluid pressure maintained under the piston. This completes the starting cycle of operation.

As has been pointed out the washing and rinsing cycle of operation is effected by the rotation of the cam member 136. The cam member 136 rotates in a clockwise direction as indicated by the arrow in Fig. 7. As this cam rotates the first cam lift 166 engages the switch arm whereby it is moved to the left-hand position so as to effect an energization of the electromagnet to cause the valve shaft 103 to move through its fourth step of motion. This operation causes the valve 71 to close and the valve 70 to open. This operation causes water to flow from the manifold 55 through the conduit 67 to the upper end of the fluid motor cylinder 30 whereby the piston 40 is caused to move downwardly in the cylinder so as to move the dish supporting rack to its working position. During this operation of the pump the fluid, which had previously been admitted beneath the piston so as to elevate the dish rack, is exhausted through the conduit 68 and through the exhaust conduit 72 to the intake 63 of the pump.

The valve 70 remains open until the next lift 167 of the cam 136 effects an energization of the electromagnet to cause the cam shaft to move through its fifth step; this operation of the shaft causes the valve 74 to open to admit water to the spray device through the conduit 73. Water is admitted for a predetermined interval of time so as to wash the dishes arranged in the rack.

During this interval of time, the cam continues to rotate and eventually the next lift 168 engages the switch to again energize the electromagnet to cause the valve shaft to move through its sixth step, which operation causes the valve 74 to close, and the valve 76 controlling the discharge conduit 75 to open, whereby the water in the vat is discharged to the drain 75.

The next cam lift 170 causes the switch 132 to close to effect an energization of the electromagnet 105 whereby the valve shaft is moved through its seventh step. This operation causes the valve 76 to close and the valve 61 to open. Fresh water is then admitted to the vat from the intake manifold 58, the quantity of water admitted being determined as before by the interval of time during which the valve 61 is held open, which interval is determined by the distance between the lifts 170 and 171.

The lift 171 of the cam then effects a reenergization of the magnet 105 to cause the valve shaft to take its eighth step of motion which operation causes the valve 61 to close, and the valve 74 to open to again permit water to flow from the manifold 65 to the spray device for a predetermined interval of time. This operation effects a rinsing action on the dishes in the rack.

As the cam 136 continues to rotate the lift 172 eventually will operate the switch to energize the electromagnet whereby the valve shaft takes its ninth step of motion, which step causes the valve 74 to close and the valve 71 to open. This operation allows water to flow to the fluid motor cylinder below the piston 40 so as to raise the dish supporting rack to its unloading position. The washing cam 136 has now completed one complete revolution; and during this revolution of the cam the dishes have been washed and rinsed, and then removed from the vat by the operation of the fluid motor.

The finishing cycle of operation, as has been pointed out, is effected by the second half revolution of the starting and finishing cam 135. During this half revolution of the cam 135, its lift 173 causes the switch to close to effect the energization of the electromagnet to move the valve shaft through its tenth step of motion which operation causes the valve 71 to close and the valve 70 to open; when the valve 70 opens fluid is admitted to the upper side of the piston 40 to move the dish supporting rack downwardly to its working position in the vat.

The eleventh step of motion of the valve shaft is effected by the lift 174 which operates the switch 132 to effect proper energization of the electromagnet 105. This operation of the valve shaft causes the valve 70 to close, and the valve 74 to open so that water is again supplied to the spray device for effecting a final rinsing of the vat.

As the cam continues to rotate the lift 175 presently will engage the switch to energize the electromagnet 105 to move the valve shaft through its twelfth step of motion, which operation causes the valve 74 to close, and the valve 76 to open whereby the water in the vat is discharged through the drain 75.

As the cam 135 returns to its original position shown in Fig. 7 the depressed portion 158a of the cam 158 will move under the lever 159 so as to allow the contacts 162 to open thereby effecting a deenergization of the pump motor.

A complete cycle of operation of the washing machine has thus been completed.

Suitable means are provided for interlocking the cams 135 and 136 and for locking the manually operable lever 153, provided to control the energization of the cam motors 140 and 141, so that this lever can be operated only to cause the cams to operate in a predetermined cycle whereby the cam 135 must be moved through its starting half revolution before the cam 136 can be rotated through its washing and rinsing revolution.

The interlock between the cams 135 and 136 comprises a pivoted arm 176 provided on one end with a pin 177 which is arranged to project through either of two diametrically arranged locking holes 178 and 179 in the cam 135, and on its other end with a pin 180 arranged to enter a locking hole 181 in the cam 136. This arm 176 insures that only one cam at a time can rotate, and also causes the cams to stop in definite and predetermined positions. This lever 176, as shown, is mechanically connected with the manually operable control lever 153 by means of a crank arm 182 arranged to rotate the lever 176 and mechanically connected by means of a link 183 with the control lever. By reason of this arrangement if the control lever be moved in its clockwise direction to effect the energization of the motor 140 the pin 177 will be withdrawn from its hole 178 to release the starting cam while the pin 180 will be pushed inward through the hole 181 so as to lock the cam 136, whereas if the control lever 153 be moved in its opposite direction to effect the energization of the motor 141 the pin 180 will be withdrawn to release the cam 136 while the pin 177 will be projected through hole 179 to lock the cam 135.

The locking means further comprises suitable means for locking the lever 153 whereby it is impossible to move it in its counter clockwise direction to effect the energization of the operating motor 141 of the washing and rinsing cam 136 before the washing machine has gone through its starting cycle. This locking means comprises a suitable arm 184 operated by means of the cam 158 and normally lying in the path of movement of the crank 182 to prevent counter clockwise motion of this crank and consequently of the control arm 153. It will be observed, however, that the control arm can be moved in its clockwise direction to effect the energization of the starting cam motor 140; and further, that after this motor has been energized to effect the starting cycle, the arm 184 will be moved out of the path of movement of the crank arm 182 by the operation of the cam 158 whereby after the cam 135 has been moved through its starting motion the lever 153 may be moved in its counter clockwise direction so as to effect the energization of the washing and rinsing cam motor 143.

It will also be observed that the interlocking arrangement between the cams 135 and 136 is such that if the control lever has been moved in one direction or the other to effect a rotation of one of the cams, the control lever will be secured in its controlling position against the bias of its centering springs 157 by means of the pin which has been withdrawn from its cam member because the end of the withdrawn pin will engage the cam surface adjacent to it until the cam has rotated through its controlling motion, whereupon the withdrawn pin will be received in the proper hole provided for it in the cam and will be automatically moved therein by means of the centering springs 157 provided for the control arm 153.

In other words, because of the interlocks between the cams and control lever, the control lever 153 can be operated initially only to close its right hand contacts so as to effect the energization of the starting and finishing cam motor 140. After this motor has been energized it will operate the cam 135 through its starting half revolution before the motor can be deenergized; upon the completion of this half revolution, the motor will be deenergized and the cam 135 stopped automatically by reason of the fact that the pin 177 will be received by the hole 179 in the cam 135 thus allowing the center springs 157 to move the lever 153 to its neutral position. After this, the lever can be operated to close its left-hand contacts to effect the energization of the washing and rinsing cam motor 141 to rotate the cam 136 through a complete revolution. During this revolution of the cam the control lever is locked in its left hand controlling position, and the cam 135 is locked at the end of its starting half-revolution. Upon the completion of a revolution of the cam 136, the lever 153 automatically will be moved to its neutral position because the pin 180 will be received in its hole 181. The lever 153 may then be returned to its right hand controlling position to cause the cam 135 to rotate through its second half revolution.

It is to be noted that after the cam 136 has completed a washing and rinsing cycle it may be repeatedly operated through this cycle without first causing the cam 135 to go through its starting half revolution.

It is desirable that suitable means be provided for controlling the electromagnet 105 whereby after it has operated its armature 106 downwardly so as to effect an operation of the cam shaft through one step of its motion the armature will be locked in its lower position until the lift of the cams 135 and 136, which has actuated the switch 132 to effect the energization of the electromagnet, has been moved away from the switch member to allow the switch member to move to its neutral position. This locking means is advisable because if one of the lifts of the cam members has operated the switch to one or the other of its controlling positions to effect an energization of the electromagnet 105 and if, when the lift is in this controlling position, the energizing circuit for the electromagnet should for some reason or other be interrupted, as for example by an interruption in the power source 62b, and then if the energizing circuit be reestablished, the electromagnet would be reenergized and as a result the valve shaft would move through a succeeding step of its motion by the operation of the same lift which caused it to move through its preceding step of motion. This obviously would throw the valve mechanism out of phase and consequently would cause an improper operation of the washing machine.

This locking means in one form of my invention comprises an electromagnet 190, the armature of which is provided with a latch 191 arranged to engage a notch 192 (Fig. 7) provided on the armature 106 of the operating electromagnet 105. A suitable spring 193 normally biases the latch 191 into locking engagement with its notch 192 so that when the armature 106 is withdrawn or is moved downwardly by its operating coil the latch 191 automatically will be received by the notch 192 to lock the armature 106 in its lower position. It will be observed that when the operating coil of the magnet 190 is energized the latch 191 will be withdrawn to permit the armature 106 to be moved to its upper position by means of the tension spring 120.

The energization of the locking magnet 190 is controlled by means of cam members 194 and 195 mounted to rotate with the cam members 135 and 136 respectively and having the same lift arrangement as these cams. These cam members 194 and 195 are arranged to operate a controlling switch 196 included in the energizing circuit of the operating coil of the electromagnet 190 and having substantially the same construction as the switch 132. The lifts on the cam members 194 and 195, however, do not align radially with the corresponding lifts provided on the cam members 135 and 136 but are displaced a slight distance backwardly with respect to these members. By reason of this arrangement when a lift of the main cams 135, 136 is just moving away from the movable member 132a of the switch 132 to allow the switch to move to its neutral position and effect a deenergization of the operating electromagnet 105, the corresponding lift of the cams 194, 195 will operate the switch 196 to complete the energizing circuit of the electromagnet 190 so as to retract the latch 191, thereby permitting the armature 106 to be moved upwardly by its spring 120, after which the electromagnet 190 will be deenergized so as to allow the latch 191 to return to its working position. This, it will be observed, effectively prevents the return of the armature 106 until the electromagnet 105 has been properly deenergized by the operation of its switch 132.

As shown in Fig. 1, the fluid operating motor for the dish supporting tray, the pump 62 and its operating motor 62a and the valve mechanism and the operating means provided therefor are compactly arranged beneath the washing vat. These members preferably will be enclosed by means of suitable closure members 186 removably secured to the vertically arranged supporting columns 15 by means of suitable screws 187. Preferably the valve control means comprising the timing cams 135 and 136, their operating motors 140 and 141, the manually operable control lever 153 and the locking and interlock means provided for the cams and the control lever will be compactly arranged in a suitable receptacle 187a provided for them and secured to the under surface of one end portion of the table ledge 16. Thus, the manually operable control lever 153 will be arranged in a location providing for convenience of operation.

In operation of the washing machine, the control lever 153 will be moved in its clockwise direction as viewed in Fig. 7, so as to effect the energization of the motor 140 to rotate the starting and finishing cam 135, and also the cam 158 provided to control the pump motor 62a. As has been pointed out, during the first half revolution of the cam 135 the pump motor will be energized, fresh water will be admitted to the vat from the supply conduit 56, a preliminary spraying action on the vat will be effected and the dish supporting tray will be moved to its loading and unloading position, whereupon the operating lever 153 will be moved to its neutral position by the operation of the cam 135 in receiving the interlocking pin 177 in the hole 179 provided in the cam.

During this starting operation, the locking arm 184 will have been moved out of the path of movement of the crank 182 so that when the attendant desires to start the washing and rinsing cycle he may do so by moving the control arm 153 in a counter clockwise direction, as viewed in Fig. 7. When the arm 153 is thus moved, the cam 136 starts to rotate and rotates through a complete revolution before it can be stopped. During this revolution the rack with the dishes loaded thereon will be moved to its working position, water will be delivered to the spray device for a predetermined interval of time to effect a cleansing action on the dishes in the rack, and thereafter will be pumped out of the vat to the discharge 75; after which the vat will be provided with fresh water and a rinsing action on the dishes will be effected, whereupon the dish supporting rack will be moved upwardly to its loading and unloading position so as to deliver the cleansed dishes to a point where they may be conveniently removed. Upon the completion of this operation the control arm 153 will be moved to its neutral position by reason of the fact that the pin 180 will be received in the hole 181 provided for it in the cam 136.

After this operation has been completed the attendant may at any suitable time move the control lever 153 in a clockwise direction to reenergize the motor 140 for the finishing cam 135. This operation effects the finishing cycle during which the dish supporting rack will be moved to its working position in the vat, the vat will be sprayed and then the water will be pumped from the vat to the discharge drain, after which the pump motor will be deenergized. One complete cycle of operation of the washing machine is then finished.

It is to be noted that when a washing and rinsing cycle has been completed, this cycle of operation may be repeated as often as is desired merely by moving the control lever 153 to effect a reenergization of the washing and rinsing cam motor 141, this operation being possible because the locking arm 184 for the control arm will have been moved from the counter clockwise path of movement of the crank arm 182 by the operation of the cam 158 during the previous starting cycle. Thus, several batches of dishes can be washed and rinsed in succession without repeatedly going through the starting cycle.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A washing machine comprising a vat, means for supporting the articles to be cleansed, means mounting said supporting means for movement from a working position in said vat to a position remote from said working position to facilitate the loading and unloading of said supporting means, power means operably associated with said supporting means to move said means between said positions, fluid circulating means within said vat arranged to hurl a cleansing fluid through said article supporting means when the latter is in said working position so as to effect a cleansing action on the articles supported by said means and means including time element control means controlling said power means and said fluid circulating means so as to establish a predetermined cycle of operation between said means.

2. A dish washing machine comprising a vat, dish supporting means within said vat, means mounting said dish supporting means for vertical motion in said vat from its working position to a position remote therefrom, fluid means for operating said supporting means, fluid circulating means within the lower portion of said vat arranged to hurl a cleansing fluid upwardly and outwardly through said dish supporting means when the latter is in its working position within said vat so as to effect a cleansing action on the dishes supported by said means, means including time element control means controlling said fluid means and said fluid circulating means so as to establish a predetermined cycle of operation between said means and a manually operable control device for said time element control means.

3. A dish washing machine comprising a vat, a dish supporting rack movably mounted in said vat, a fluid motor operably associated with said rack for moving said rack into and out of said vat, means for creating a fluid pressure to operate said fluid motor, valve means controlling the fluid supplied to said motor, a spray device in said vat arranged to hurl a cleansing fluid through said rack when the latter is in its working position in said vat so as to effect a cleansing action on the dishes supported by said rack, a source of cleansing fluid supply for said spray device, valve means controlling the fluid supplied from said source, time control means operating both of said valve means to establish a predetermined cycle of operations of said fluid motor and said spray device and a manually operable control member controlling said time control means.

4. A dish washing machine comprising a vat, a dish supporting rack, means mounting said rack for movement in said vat, a fluid motor operably associated with said rack for moving said rack from its working position to a loading and unloading position, a source of fluid supply for operating said motor, a fluid spray device in said vat below said rack arranged to hurl a cleansing fluid upwardly and outwardly through said rack when the latter is in its working position so as to effect a cleansing action on the dishes in said rack, a source of cleansing fluid supply for said spray device, valve means for controlling said sources of fluid supply and means including time element mechanism controlling the operation of said valve means.

5. A dish washing machine comprising a vat, a dish supporting rack, a fluid motor connected to operate said rack so that it can be moved from its working position in said vat to a position remote therefrom to facilitate the loading and unloading of said rack, a pump for creating a fluid pressure to operate said fluid motor, said pump having an intake communicating with said vat and a delivery communicating with said fluid motor so that fluid withdrawn from said vat is delivered under pressure to operate said fluid motor, valve means controlling the fluid supplied to said fluid motor, means for operating said valve means, and means arranged to control the operation of said valve means so as to establish a predetermined cycle of operation of said fluid motor.

6. A dish washing machine comprising a vat, a dish supporting rack, means mounting said rack for vertical motion in said vat so that said rack can be moved between its working position in said vat and a position remote therefrom, a fluid motor arranged to operate said rack between said positions, a pump having an intake connected to said vat and a delivery connected with said fluid motor so that fluid withdrawn from said vat is delivered under pressure to operate said fluid motor, valve means controlling the fluid supplied to said motor, electromagnetic operating means for said valve means and timing mechanism controlling the operation of said electromagnetic means.

7. The combination with a washing machine having a vat, of means for introducing a cleansing fluid to said vat comprising a single source of fluid supply, a conduit between said source and said vat, valve means controlling said conduit, a drain for said vat, valve means controlling said drain, means for operating said valve means, cams arranged to selectively control the operation of said valve operating means, each cam being arranged to effect the operation of said valves in a predetermined sequence, timing mechanism for driving said cams and means controlling said timing mechanism to effect the selective operation of said cams.

8. A dish washing machine comprising a vat, means in said vat arranged to circulate a cleansing fluid through said vat, a pump, conduit means connecting the delivery of said pump with said fluid circulating means, valve means interposed in said conduit means, a fluid reservoir communicating with the intake of said pump, means for supplying said reservoir with fresh supplies of cleansing fluid, valve means controlling said fluid supplying means and time element mechanism controlling both of said valve means to provide for the supply of fresh fluid to said reservoir and the supply of fluid from said pump to said circulating means for predetermined intervals of time in a predetermined cycle of operation.

9. A dish washing machine comprising a vat, a dish supporting rack in said vat, a spray device in said vat arranged to spray a cleansing fluid supplied to said device through said rack, a source of fresh fluid supply for said vat, valve means controlling said source, a fluid pump, a fluid intake for said pump communicating with said vat, the vat constituting a fluid reservoir for said pump, a fluid delivery for said pump communicating with said spray device, valve means in said delivery controlling the fluid supplied to said spray device and timing means arranged to control both of said valve means to provide for the supply of fresh fluid to said vat and then to said spray device for predetermined intervals of time in a predetermined cycle of operation.

10. A dish washing machine comprising a vat, a dish supporting rack in said vat, means mounting said rack for movement between a working position in said vat and another position, a spray device in said vat arranged to spray a cleansing fluid into said rack when the latter is in its working position, a fluid pump, a fluid motor connected to move said rack from it working position to said other position and means for selectively supplying fluid from said pump to said spray device and said motor.

11. A dish washing machine comprising a vat, a dish supporting rack in said vat, means mounting said rack for movement between a working position in said vat and another position, a spray device in said vat arranged to spray a cleansing fluid into said rack when the latter is in said working position, a fluid pump, a fluid motor connected to lift said rack from its working to said other position and time element means for selectively supplying fluid from said pump to said spray device and said motor.

12. A dish washing machine comprising a vat, a dish supporting rack in said vat, means movably mounting said rack, a fluid motor operably associated with said rack for moving it from its working position to a position remote therefrom to facilitate the loading and unloading of said rack, a spray device in said vat for spraying a cleansing fluid through said rack, means for directing a cleansing fluid from said vat under pressure to operate said fluid motor and also to said spray device, valve means for controlling the fluid supplied to said motor and said spray device in a predetermined cycle and timing means controlling the operation of said valve means so that after said rack has been moved from its remote to its working position fluid is delivered to said spray device for a predetermined interval of time and thereafter in a predetermined cycle of operation said rack is returned to said remote position.

13. A washing machine comprising a vat, a rack in said vat for supporting the articles to be cleansed, means mounting said rack so that it can be moved from its working position in said vat to a position remote therefrom to facilitate the loading and unloading of said rack, power means arranged to operate said rack between said positions, means in said vat for circulating a cleansing fluid through said rack when said rack is in its working position, and means controlling said power means and said fluid circulating means so as to establish a predetermined sequence in their operation.

14. A dish washing machine comprising a vat, a spray device in said vat arranged to spray cleansing fluid through said vat, a source of fluid supply, conduit means between said source and said vat, a pump, an intake for said pump communicating with said vat and a delivery for said pump communicating with said spray device so that fluid withdrawn from said vat by the operation of said pump is delivered under pressure to said spray device, a drain conduit for said vat communicating with said discharge of said pump and means including time element mechanism for controlling said conduit means and said pump delivery so that a cleansing fluid is supplied from said fluid source to said vat and thereafter is delivered from said vat by the operation of said pump to said spray device for a predetermined interval of time after which the fluid in said vat is delivered to said drain.

15. A dish washing machine comprising a vat, a dish supporting rack, means movably mounting said dish supporting rack so that it can be moved from its working position to a position remote therefrom to facilitate the loading and unloading of said rack, a fluid motor operably associated with said rack to move it between said positions, a spray device in said vat for spraying a cleansing fluid through said rack, a source of fluid supply, conduit means between said source and said vat, a fluid pump, conduit means between said vat and said pump and between said pump and said spray device and said fluid motor whereby fluid in said vat is delivered under pressure to said spray device and to said motor, a discharge conduit for said vat communicating with the delivery of said pump, valve means for controlling said conduits, means including time element mechanism controlling said valve means so as to establish a predetermined sequence of operation thereof including starting, washing and rinsing and finishing cycles of operation, whereby fluid is delivered from said source to said vat and thereafter fluid is withdrawn from said vat and delivered by said pump to said fluid motor so as to move said rack to its loading position thus completing the starting cycle of operation, after which fluid is supplied to said fluid motor to return said rack to its working position and then is pumped from said vat to said spray device for a predetermined interval of time to cleanse the articles on said rack and then is withdrawn from said vat and delivered by said pump to said discharge conduit after which fluid is again delivered to said vat from said source and from said vat is again delivered by said pump to said spray device for a predetermined interval of time so as to rinse the articles on said rack after which fluid is delivered by said pump to said fluid motor to move said rack to its unloading position thereby completing the said washing and rinsing cycle, after which fluid is delivered by said pump to said fluid motor to return said rack to its working position and then is delivered by said pump from said vat to said discharge conduit thereby completing the finishing cycle of operation, manually operable means for controlling said timing mechanism to initiate the operation thereof upon the completion of each cycle to effect the succeeding cycle of operation, said timing mechanism being arranged to cease operation automatically upon the completion of each cycle.

16. A washing machine comprising a vat, a rack in said vat for supporting the articles to be cleansed, means movably mounting said rack so that it can be moved from its working position in said vat to a position remote from said working position, fluid means for operating said rack between said positions, a spray device in said vat arranged to spray cleansing fluid through said rack when the latter is in its working position and manually controllable means for effecting the operation of said spray device and said fluid operating means in a predetermined sequence of operation.

17. A washing machine comprising a vat, a rack in said vat for supporting the articles to be cleansed, means movably mounting said rack so that it can be moved from its working position in said vat to a position adjacent the mouth of said vat, fluid means for operating said rack between said positions, a spray device in said vat arranged to spray cleansing fluid through said rack, manually controllable means for effecting the operation of said spray device and said fluid operating means in a predetermined sequence and locking means operably associated with said manually controllable means insuring a predetermined cycle of operations of said fluid operating means and said spray device.

18. A washing machine comprising a vat, a rack in said vat for supporting the articles to be cleansed, means mounting said rack for movement from its working position in said vat to a loading and unloading position remote from said working position, power means arranged to operate said rack between said positions, means in said vat arranged to circulate a cleansing fluid through said vat, a manually operable control device, means controlled by said control device controlling said power means and said fluid circulating means to operate in a predetermined sequence and locking means operably associated with said control device and controlling means insuring a predetermined cycle of operation of said power means and said fluid circulating means and providing for a repetition of certain of said operations at will thereafter.

19. A dish washing machine comprising a vat, a dish supporting rack in said vat, means mounting said rack for movement from its working position to another position to facilitate the loading and unloading of said rack, a fluid motor operably associated with said rack to move it between said positions, a spray device in said vat for spraying a cleansing fluid through said rack, a source of fluid supply for said spray device and for operating said fluid motor, valve means arranged to control the fluid supplied to said spray device and to said fluid motor in a predetermined sequence, electroresponsive operating means for said valve means, a control circuit for said electroresponsive means, switching means in said circuit for controlling the energization thereof, a timing mechanism comprising a plurality of cam members operably associated with said switching means for controlling the same to effect the energization and deenergization of said control circuit whereby said valves are operated in said predetermined sequence, second electroresponsive means for controlling the motions of said cams, manually operable means arranged to control said second electroresponsive means and locking means operably associated with said manually operable means so as to prevent the initial operation thereof except that to effect a predetermined cycle of operations of said fluid motor and said spray device.

20. A dish washing machine comprising a vat, a dish supporting rack mounted in said vat for movement from a working position to a loading and unloading position, a fluid motor for operating said rack between said positions, a spray device in said vat arranged to spray cleansing fluid through said rack, a source of fluid supply, a conduit from said source communicating with the interior of said vat, a control valve in said conduit, a pump, an intake for said pump communicating with the interior of said vat, a delivery for said pump, conduits connecting said delivery with said fluid motor, control valves in said conduits, a conduit connecting said pump delivery with said spray device, a control valve in said conduit, a fluid drain for said vat communicating with said pump delivery, a control valve in said drain, means including an electromagnetic device for operating said valves in a predetermined sequence, switching means controlling the energization of said electromagnetic device and means arranged to control the operation of said switching means comprising a cam member arranged to operate said switching means so that during the first half revolution of said cam said valves are operated to cause fluid to flow from said supply source to said vat and thereafter to control the flow of fluid from said pump to said fluid motor whereby the latter causes said rack to move to its loading position, a second cam arranged to operate said switch so that during one revolution of said cam said valves are operated to control the flow of fluid from said pump to said fluid motor whereby the latter causes said rack to move to its working position after which fluid is directed from said pump to said spray device to effect a cleansing action on the articles in said rack and then fluid in said vat is pumped from said vat to said drain by the operation of said pump after which fresh fluid is again allowed to pass from said source to said vat from which it is delivered by said pump to said spray device to effect a rinsing action on the articles in said rack and then fluid is directed from said pump delivery to said fluid motor whereby the latter causes the rack to move to its unloading position, said first cam being arranged so that during the second half of its revolution it effects an operation of said valves whereby fluid is delivered by said pump to said fluid motor so that it operates to move said rack to its working position after which fluid is directed from said pump to said spray device and then is pumped from said vat to said discharge drain, and means for controlling the operation of said cams so as to provide for their operation only in a predetermined sequence whereby said first cam must be moved through its first half revolution before said second cam can be moved through its complete revolution.

21. A dishwashing machine comprising a vat, a dish supporting rack in said vat mounted so that it can be moved between a loading and unloading position and a working position, a fluid motor for operating said rack between said positions, a spray device in said vat arranged to spray a cleansing fluid through said rack, a pump, a source of fluid supply for said pump, conduit means connecting the delivery of said pump with said spray device and with said fluid motor, a plurality of valves for controlling said conduits, a common operating shaft for said valves, an electroresponsive device arranged to give said shaft a step by step motion, cams on said shaft operably associated with said valves to give them a predetermined sequence of operation during the rotation of said shaft so that fluid is supplied to said spray device to cleanse the articles in said rack and to said fluid motor to operate said rack between said positions in a predetermined cycle of operation and means for controlling the energization of said electromagnetic device.

22. A dish washing machine comprising a vat, a dish supporting rack in said vat mounted so that it can be moved between a working and a loading and unloading position, a fluid motor for operating said rack between said positions, a spray device in said vat arranged to spray a cleansing fluid through said rack, a source of fluid supply for said fluid motor and said spray device, conduits between said source of supply and said fluid motor and said spray device, a plurality of valves controlling said conduits, means comprising a common operating shaft for said valves whereby said valves are operated in a predetermined sequence, power means for operating said shaft, a mechanical connection between said power means and said shaft so that a step by step motion is imparted to said shaft and means for locking said shaft upon the completion of each step of said motion for preventing overtravel of said shaft.

23. A dish washing machine comprising a vat, a dish supporting rack in said vat mounted so that it can be moved between a loading and unloading position and a working position, a fluid motor for operating said rack between said positions, a spray device in said vat arranged to spray a cleansing fluid through said rack, a pump, a source of fluid supply for said pump, conduit means connecting the delivery of said pump with said spray device and with said fluid motor, a plurality of valves for controlling said conduits, a common operating shaft for said valves, an electromagnet for operating said shaft, a mechanical connection between said shaft and said electromagnet comprising a ratchet wheel secured on said shaft, an arm, a pawl on said arm cooperating with said wheel to move said shaft through a step by step motion when said arm is actuated, means connecting said arm to the armature of said electromagnet so that when said magnet is energized said armature is retracted to operate said ratchet wheel through one step of its motion, a spring member biasing said armature to its unretracted position, an energizing circuit for said electromagnet, switching means controlling the energization of said circuit, means for locking said armature in its retracted position when said switching means is in position to effect the energization of said electromagnet and for releasing said armature when said switching means is in position to effect the deenergization of said electromagnet.

24. A dish washing machine comprising a vat, a dish supporting rack movably mounted in said vat between working and loading and unloading positions, a fluid motor comprising a cylinder and operating piston therein, the piston being connected to operate said rack between said positions, a spray device in said vat beneath said rack arranged to spray a cleansing fluid upwardly therethrough, a source of fluid supply, an intake manifold communicating with said source of supply, a conduit communicating with said intake manifold and with said vat, a valve in said manifold for controlling said conduit, a fluid pump, an intake for said pump communicating with the vat, a second fluid manifold communicating with the delivery of said pump, conduits connecting said second manifold with the opposite ends of said fluid motor cylinder, valves in said second manifold controlling said fluid motor conduits, a conduit connecting said second manifold with said spray device, a valve in said second manifold controlling said spray device conduit, a drain conduit communicating with said second manifold and a valve in said second manifold controlling said drain conduit, a common operating shaft for said valves, cams on said shaft arranged to cause said valves to operate in a predetermined sequence as said shaft is being rotated, an electromagnetic device, a driving connection between said electromagnetic device and said shaft providing a step by step rotary motion of said shaft by successive operations of said electromagnetic device, a switch, electrical connections between said switch and said electromagnetic device whereby the energization of said device is controlled by the operation of said switch, a pair of cam members arranged to separately control the operation of said switch so that as each revolves it causes said electromagnetic device to rotate said shaft through successive steps of its motion, motive means for rotating said cams, manually operable means for controlling said motive means and means comprising interlocking means between said cams and locking means for said manually operable means so as to prevent the operation of said motive means except to rotate said cams in a predetermined relation with respect to each other.

25. A dish washing machine comprising a vat, a dish supporting rack movably mounted in said vat for motion between a working position and a position remote therefrom to facilitate the loading and unloading of said rack, a fluid operating motor for said rack, a spray device rotatably mounted in said vat and provided with reaction nozzles arranged to be revolved by the admission thereto of fluid under pressure, means for delivering to said fluid motor and to said spray device a fluid under pressure for operating the same, means including valve means arranged to control the fluid supplied to said motor and to said spray device, electroresponsive operating means operably associated with said valve means and timing means for controlling the operation of said electroresponsive operating means so as to cause said valves to be operated in a predetermined sequence whereby said spray device and said fluid motor are operated in a predetermined sequence, said timing means comprising a switch for controlling the energization of said electromagnetic valve operating means, cam members operably associated with said switch for actuating it at predetermined intervals when said cams are operated, motive means for operating said cams, manually operable control means controlling the operation of said motive means and means for preventing the operation of said manually operable control means to effect a controlling action on said motive means except to provide for a predetermined cycle in the operation of said cam members.

26. A dish washing machine comprising a vat, a dish supporting rack movably mounted in said vat for motion between a working position and a position remote therefrom to facilitate the loading and unloading of said rack, a fluid operating motor for said rack, a spray device rotatably mounted in said vat and provided with reaction nozzles arranged to be revolved by the admission thereto of fluid under pressure, a pump for delivering to said fluid motor and to said spray device a fluid under pressure for operating said members, an electric motor for operating said pump, valve means arranged to control the fluid supplied to said fluid motor and to said spray device, electroresponsive means operably associated with said valves for operating them in a predetermined sequence whereby said spray device and said fluid motor are operated in a predetermined sequence, a switch for controlling the energization of said electroresponsive valve operating means, a pair of rotatably mounted cam members operably associated with said switch for actuating said switch at predetermined intervals when said cams are rotated, a pair of motors for operating said cams manually operable means for controlling the operation of said motors, means for preventing the operation of said manually operable control means to effect a controlling action on said motors except to provide for a predetermined sequence in the operation of said cams, a second switch for controlling the energization of said pump driving motor and a third cam member operated by one of said motors for controlling the operation of said second switch.

27. A dishwashing machine comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means including an electro-responsive device controlling the operation of said valves, switching means controlling the energization of said electro-responsive means, a plurality of cams for operating said switching means, each cam arranged to operate said switching means so as to effect a predetermined sequence in the operation of said valves and time element mechanism for selectively operating said cams.

28. A dishwashing machine comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means including an electro-responsive device controlling the operation of said valves, switching means controlling the energization of said electro-responsive means, a plurality of cams for operating said switching means, each cam arranged to operate said switching means so as to effect a predetermined sequence in the operation of said valves, time element mechanism for operating said cams, and manually controllable means for effecting the operation of said time element mechanism to operate said cams in a predetermined sequence.

29. A dishwashing machine comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means for operating said valves, a plurality of cams arranged to control the operation of said valve operating means, each to cause said valve operating means to operate said valves in a different predetermined sequence and means for operating said cams in a predetermined sequence.

30. A dishwashing machine comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means for operating said valves, a plurality of cams arranged to control the operation of said valve operating means, each to cause said valve operating means to operate said valves in a different predetermined sequence, time element operating mechanism for said cams, a manually operable means controlling said time element mechanism, locking means operably associated with said manually operable means so as to prevent the initial operation thereof except that to effect a predetermined cycle in the operation of said cams.

31. A dishwashing machine comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means including an electro-responsive device controlling the operation of said valves, switching means controlling the energization of said electro-responsive means, a plurality of cams for operating said switching means, each cam arranged to operate said switching means so as to effect a predetermined sequence in the operation of said valves, time element mechanism for operating said cams, manually operable means for controlling said time element mechanism and means comprising interlocking means between said cams and locking means for said manually operable means so as to prevent the operation of said time element mechanism except to operate said cams in a predetermined relation with respect to each other.

32. A dishwashing machine comprising a vat, means for circulating a cleansing fluid in said vat, a source of fluid supply for said vat, a conduit between said source of supply and said vat, a valve controlling said conduit, a conduit connected with said vat for draining said vat, a valve controlling said drain conduit, means including an electro-responsive device controlling the operation of said valves, a switch controlling the energization of said electro-responsive device, a plurality of cams for operating said switch, each cam being arranged to operate said switch so as to effect a predetermined sequence in the operation of said valves, time element mechanism arranged to operate said cams, manually operable control means controlling the operation of said time element mechanism and means for preventing the operation of said manually operable control means to effect a controlling action on said time element mechanism except to provide for a predetermined cycle in the operation of said cams.

33. A dishwashing machine comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, electro-responsive means arranged to operate said valves, switching means controlling the energization of said electro-responsive means, a pair of cams arranged to operate said switching means, each to effect a different preselected operation of said valves, a pair of time element devices for operating said cams respectively and a manually operable control member for effecting the operation of said time element devices.

34. A dishwashing apparatus comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means comprising a common operating shaft for said valves whereby said valves are operated in a predetermined sequence, power means for operating said shaft, a mechanical connection between said power means and said shaft so that a step by step motion is imparted to said shaft by operation of said power means, time element mechanism controlling the operation of said power means and means operated responsively to the operation of said time element mechanism for locking said shaft upon the completion of each step of said motion for preventing overtravel of said shaft.

35. A dishwashing apparatus comprising a vat, means for circulating a cleansing fluid in said vat, a source of fluid supply for said vat, a conduit between said source of supply and said vat, a valve controlling said conduit, a conduit connected with said vat for draining the vat, a valve controlling said drain conduit, means comprising a common operating shaft for said valves whereby said valves are operated in a predetermined sequence, power means for operating said shaft, a mechanical connection between said power means and said shaft so that a step by step motion is imparted to said shaft by operation of said power means, cams controlling the operation of said power means, means for locking said shaft upon the completion of each step of said motion and cams operated with said first cams controlling the operation of said locking means.

JOSEPH D. FREDERICKS.